US010235347B1

(12) United States Patent
Jenkins et al.

(10) Patent No.: US 10,235,347 B1
(45) Date of Patent: Mar. 19, 2019

(54) SYSTEMS AND METHODS FOR MANAGING ADAPTIVE ELECTRONIC COMMUNICATIONS

(71) Applicant: WALGREEN CO., Deerfield, IL (US)

(72) Inventors: Nicholas F. Jenkins, Chicago, IL (US); Joshua L. Holden, Chicago, IL (US); Neer Spinner, Chicago, IL (US); Stefan R. Clark, Chicago, IL (US); Marina Karassellos, Chicago, IL (US); Chelsea Coolsaet, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 224 days.

(21) Appl. No.: 14/465,284

(22) Filed: Aug. 21, 2014

Related U.S. Application Data

(60) Provisional application No. 62/006,643, filed on Jun. 2, 2014.

(51) Int. Cl.
G06F 17/20 (2006.01)
G06F 17/22 (2006.01)
G06F 17/21 (2006.01)

(52) U.S. Cl.
CPC ........ *G06F 17/2264* (2013.01); *G06F 17/212* (2013.01)

(58) Field of Classification Search
CPC .................................................. G06F 17/211
See application file for complete search history.

(56) References Cited

U.S. PATENT DOCUMENTS

| 8,176,416 | B1* | 5/2012 | Williams | G06F 17/2247 715/243 |
| 8,307,045 | B1* | 11/2012 | Shmulevich | G06F 9/541 709/217 |
| 8,959,427 | B1* | 2/2015 | Carlsson | G06F 17/3089 715/236 |
| 2005/0210414 | A1* | 9/2005 | Angiulo | G06F 17/3089 715/838 |
| 2014/0351692 | A1* | 11/2014 | Ge | G06F 17/2247 715/235 |

(Continued)

OTHER PUBLICATIONS

Returnpath.com, "Email in Motion: How Mobile is Leading the Email Revolution," (2012). Retrieved from the Internet on Jul. 30, 2015: http://returnpath.com/blog/email-in-motion-how-mobile-is-leading-the-email-revolution/.

(Continued)

*Primary Examiner* — Keith D Bloomquist
*Assistant Examiner* — Shahid K Khan
(74) *Attorney, Agent, or Firm* — Marshall, Gerstein & Borun LLP; Randall G. Rueth

(57) ABSTRACT

Methods and systems for generating adaptive electronic communications such as e-mails for access by a plurality of different electronic devices. According to aspects, the methods and systems may facilitate the design of an adaptive communication through the ordering of modules specifying the markup of various display content such as text and images, where the adaptive communication includes multiple layouts that are designed according to various display characteristics of accessing devices. The systems and methods add media queries to the adaptive communications that specify which of the layouts that an accessing device should display to a user.

12 Claims, 5 Drawing Sheets

(56) References Cited

U.S. PATENT DOCUMENTS

2015/0106928 A1* 4/2015 Steinmann .............. H04L 51/30
726/23

OTHER PUBLICATIONS

Knowledge.bazaarvoice.com, "Editing Email Templates," (2015). Retrieved from the Internet on Jul. 30, 2015: http://knowledge.bazaarvoice.com/wp-content/conversations/en_US/KB/Content/Email_and_notifications/Editing_email_templates.htm.
Strongview.com, "Marketing in the Mobile Email Revolution," (2012). Retrieved from the Internet on Jul. 30, 2015: http://www.strongview.com/resources/blog/marketing-in-the-mobile-email-revolution.
Adworkshop.com, "Designing and Coding Effective Adaptive Email Layouts," (2013). Retrieved from the Internet on Jul. 30, 2015: https://www.adworkshop.com/blog/2013/06/designing-and-coding-effective-adaptive-email-layouts.

* cited by examiner

SYSTEMS AND METHODS FOR MANAGING ADAPTIVE ELECTRONIC COMMUNICATIONS

CROSS-REFERENCE TO RELATED APPLICATIONS

This application claims the benefit of U.S. Provisional Application No. 62/006,643, filed Jun. 2, 2014, which is incorporated by reference herein in its entirety.

FIELD OF THE DISCLOSURE

The present disclosure generally relates to adaptive electronic communications and, more particularly, to systems and methods for processing and generating adaptive e-mail to be viewed on a plurality of electronic devices.

BACKGROUND

Individuals today use a variety of devices for a variety of applications in everyday life. For example, users may access their e-mail via desktop or notebook computers, tablet devices, smartphones, and/or other devices. Each of the devices has different properties or characteristics that may enhance or detract from certain of the applications. Continuing with the example, different size devices have different screen resolutions, which may result in certain e-mail content appearing too small on smaller devices and certain e-mail content appearing too large on larger devices.

To alleviate some of these issues, entities having large e-mail subscriber lists essentially design and assemble e-mails that contain code for multiple layouts depending on the size of the device that accesses the e-mails. These single e-mails are sometimes referred to as adaptive e-mails. The entities send the adaptive e-mail to the subscriber list, and a different section of code is retrieved (resulting in a different e-mail layout) based on a characteristic of the device that accesses the e-mail. However, the steps that are needed to design and assemble the e-mails prove time consuming. In particular, developers must individually code each different layout within an e-mail, which effectively multiplies the amount of work that is required to generate the e-mail.

Accordingly, there is an opportunity for techniques for effectively and efficiently processing and generating adaptive e-mails.

SUMMARY

In an embodiment, a computer-implemented method of generating adaptive markup files compatible with a plurality of display characteristics is provided. The method includes identifying, by one or more processors, an ordering of modules, each of the modules in the ordering of modules corresponding to a snippet of markup language associated with visual content, generating, by one or more processors, a first markup language layout having a first display characteristic, the first markup language layout including a plurality of first modules according to the ordering of modules, and generating, by one or more processors, a second markup language layout having a second display characteristic, the second markup language layout including a plurality of second modules according to the ordering of modules, wherein the first display characteristic is different from the second display characteristic. The method further includes receiving, via a user interface, a set of modifications to the first markup language layout and to the second markup language layout, the set of modifications associated with visual content, and saving, by one or more processors, an electronic markup language file including the first markup language layout with the set of modifications and the second markup language layout with the set of modifications.

In another embodiment, a system of generating adaptive markup files compatible with a plurality of display characteristics is provided. The system comprises a user interface configured to receive content, a memory for storing a plurality of modules, each of the plurality of modules including computer-readable markup language code associated with visual content, and a presentation module executable by a processor, the presentation module adapted to interface with the user interface and the memory. The processor is configured to identify an ordering of at least a portion of the plurality of modules, generate a first markup language layout having a first display characteristic, the first markup language layout including a plurality of first modules, from the portion of the plurality of modules, according to the ordering, and generate a second markup language layout having a second display characteristic, the second markup language layout including a plurality of second modules, from the portion of the plurality of modules, according to the ordering, wherein the first display characteristic is different from the second display characteristic. The processor is further configured to receive, via the user interface, a set of modifications to the first markup language layout and to the second markup language layout, the set of modifications associated with visual content, and save an electronic markup language file including the first markup language layout with the set of modifications and the second markup language layout with the set of modifications.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
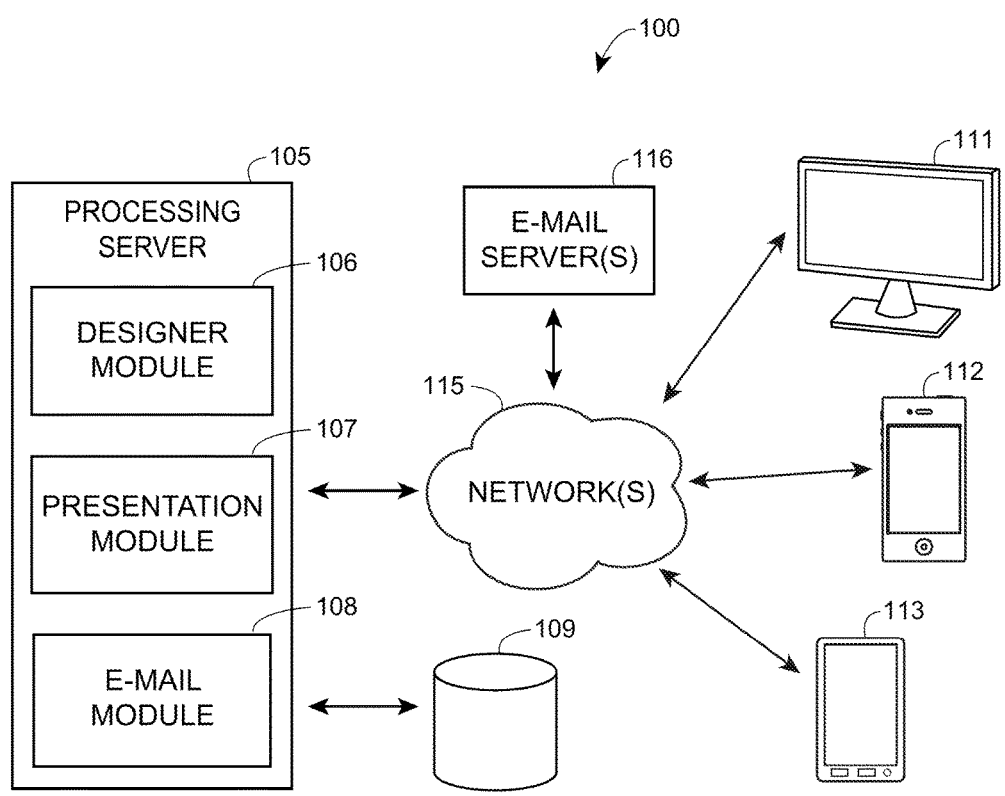
FIG. 1 depicts an example configuration including various components and entities associated with processing, generating, and accessing adaptive e-mails, in accordance with some embodiments.

The novel systems and methods disclosed herein relate generally to processing and generating electronic communications such as e-mails. Current e-mail users employ a wide variety of devices to access e-mail accounts. For example, users may employ smartphones, tablets, notebook computers, desktop computers, and/or the like. However, most e-mails are not tailored or optimized for display on all types of devices. Adaptive e-mails include multiple layouts to account for multiple types of accessing devices, but generating or otherwise coding adaptive e-mails is often costly and time-consuming.

The systems and methods support efficient and effective techniques for processing and generating adaptive e-mails. A memory may store a set of modules (e.g., computer-executable instructions) that each corresponds to a particular layout for various display content, such as textual content and/or visual content. For example, one particular module may include an image and a selectable link. Each module may further include multiple versions, where each version is designed to be accessed by a particular type of device (e.g., smartphone, tablet, desktop computer, etc.) according to various display characteristics (e.g., resolution, screen size, orientation, etc.).

A user may interface with various software applications to design a particular e-mail by ordering various modules from the set of modules. The systems and methods may generate multiple layouts, where each layout is designed for display on a particular type of device and where each layout includes type-specific modules based on the ordering. A user may modify the modules in each layout by including various textual content, visual content, and/or selectable links. In embodiments, the modifications to the modules may be consistent across the layouts such that accessing users will view the same content (but not necessarily the same display characteristics) no matter the characteristics of the accessing device. The systems and methods may generate a final electronic markup language file that includes the modifications and also specifies which layout for the accessing device to access. In particular, the final electronic markup language file includes a display characteristic (e.g., screen size) for each included layout such that the accessing devices will display the appropriate layout based on their corresponding display characteristic.

The systems and methods therefore offer numerous benefits. In particular, users such as programmers may efficiently design e-mails by selecting pre-coded modules. Further, the systems and methods enable the users to modify the modules by inserting text and other visual content into the modules. The systems and methods automatically generate a markup language file that includes multiple layouts and specifies various types of accessing devices. In this regard, the systems and methods decrease the required resources for generating adaptive e-mails, which is beneficial to entities such as corporations that generate e-mails for large distribution lists.

The systems and methods discussed and envisioned herein may be extended to a wide variety of technologies and technical fields. In particular, the systems and technologies may be implemented across various categories of electronic markup, such as presentational markup used by word-processing systems, procedural markup for implementing programming constructs such as macros and subroutines, and descriptive markup used to label parts of documents. The systems and methods, therefore, reduce the amount of time and resources required to generate markup files across all of these technologies and technical fields.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

FIG. 1 depicts an example environment 100 associated with designing and generating adaptive e-mails. Although FIG. 1 depicts certain entities, components, and devices, it should be appreciated that additional or alternate entities and components are envisioned.

As illustrated in FIG. 1, the environment 100 includes a processing server 105 configured to facilitate various of the functionalities as discussed herein. The processing server 105 may include any combination of hardware and software elements and modules, and may be associated with any company, corporation, individual, group of individuals, or the like.

The processing server 105 may include one or more modules or applications that are configured to support and implement various features of the described systems and methods. In particular, the processing server 105 may include a designer module 106, a presentation module 107, and an e-mail module 108. Each of the designer module 106, the presentation module 107, and the e-mail module 108 may interface with various components and interfaces of the processing server 105 to support and facilitate the corresponding functionalities. Further, one or more users or individuals (e.g., developers, programmers, administrators, etc.) may interface with each of the designer module 106, the presentation module 107, and the e-mail module 108. Although illustrated as separate modules within the processing server 105, it should be appreciated that two or more of the designer module 106, the presentation module 107, and the e-mail module 108 may be combined into a single module.

The processing server 105 may interface with storage 109 that stores various information and data that may be accessed by any of the modules 106, 107, 108. The storage 109 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Although illustrated as separate from the processing server 105, it should be appreciated that the storage 109 may alternatively be included as part of the processing server 105.

According to embodiments, the storage 109 may store a set of modules that each includes a snippet or portion of computer-executable code or instructions that may be included in an electronic communication such as an e-mail. The computer-executable code or instructions may indicate various visual parameters such as colors, borders, spacing, heights, widths, specific visual elements, and/or the like. In some cases, the modules may be composed of HyperText Markup Language (HTML) code, although additional formats and languages are envisioned. For example, the modules may be composed of various markup languages such as HTML, XML, Scribe, XHTML, and others. A module may be composed of a set of "sub-modules," where each of the sub-modules in a set may include the same or similar display elements or features. However, each sub-module may specify (and may be designed for) a certain electronic device having a particular display characteristic (e.g., screen size, screen resolution, and/or the like), or range of display characteristics. For example, there may be a module set "A"

that includes three sub-modules: module A1 that is intended for electronic devices with a screen resolution width of under 700 pixels, module A2 that is intended for electronic devices with a screen resolution width of 700-1200 pixels, and module A3 that is intended for electronic devices with a screen resolution width greater than 1200 pixels.

According to embodiments, the designer module 106 is configured to enable a user to input or specify the layout requirements for an adaptive e-mail. Generally, the layout requirements may indicate the ordering and placement of certain visual or textual content in an e-mail to be generated. The designer module 106 may, in some cases, enable the user to indicate the sequence of modules or may, in other cases, automatically generate the sequence of modules based on previously generated e-mails, various requirements, or other factors. For example, the sequence of modules may include a first module corresponding to a title or heading, followed by a second module corresponding to an offer with a call to action (CTA) (i.e., a selectable link), followed by a third module corresponding to a set of images.

The presentation module 107 is configured to assemble, generate, or otherwise process code (e.g., machine-readable instructions) corresponding to the adaptive e-mail, where the code is generated according to the layout requirements specified by the designer module 106. In some embodiments, the presentation module 107 can generate the adaptive e-mail automatically; in other embodiments, an individual can interface with the presentation module 107 to facilitate the generation of the adaptive e-mail. The presentation module 107 is configured to access, from the storage 109, appropriate modules as indicated in the layout requirements. The presentation module 107 generates the adaptive e-mail to include multiple layouts each associated with a particular display characteristic (e.g., screen size or range of screen sizes), where each layout includes a set of appropriately-coded modules corresponding to the particular display characteristic.

For example, assume that an e-mail designer working for a convenience store wishes to design an e-mail that includes various specials that the convenience store will be offering for the following week. The designer may specify, for the e-mail, a layout requirement with the following layout: a title/header, a main offer, a secondary offer, and a footer. The presentation module 107 can then generate a first layout that is intended for smartphones (e.g., electronic devices with a screen resolution width of under 700 pixels) with the following modules: a smartphone title/header module, a smartphone main offer module, a smartphone secondary offer module, and a smartphone footer module; and generate a second layout that is intended for tablets (e.g., electronic devices with a screen resolution width between 700-1200 pixels) with the following modules: a tablet title/header module, a tablet main offer module, a tablet secondary offer module, and a tablet footer module.

The presentation module 107 further enables the addition of various visual and/or textual content (generally, "display content") into the modules within the code or instructions of the modules. The display content may be specific to the content that is displayed within the e-mail. For example, if the module within the adaptive e-mail code corresponds to an offer for laundry detergent, then the presentation module 107 enables a developer to insert an image of the laundry detergent as well as text describing the offer (e.g., "20% off laundry detergent through Friday!"). The presentation module 107 enables the insertion of display content within each layout and the modules thereof in the adaptive e-mail code, with each layout corresponding to a different display characteristic of the accessing devices. In embodiments, the display content is the same or similar across each layout to ensure that the end users will view the same content regardless of the accessing device.

The presentation module 107 is further configured to generate a markup language file based on the adaptive e-mail code managed by the presentation module 107. The markup language file includes each layout included in the adaptive e-mail code as well as the display content added into or otherwise included in each layout. Generally, the markup language file includes data that specifies how content contained therein is to be displaying on an accessing application. For example, the markup language file may be an HTML file accessible by a web browser application, whereby a user operating the web browser application can view content specified in the HTML file.

The e-mail module 108 can access the markup language file generated by the presentation module 107 and send the markup language file as part of an e-mail to a list of e-mail addresses (generally, a list of subscribers). In particular, the e-mail module 108 may transmit the e-mail to one or more e-mail servers 116 via one or more networks 115. The e-mail server(s) 116 may be associated with e-mail providers of the list of subscribers for the e-mail. It should be understood that the network(s) 115 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, and/or others). In embodiments, the e-mail module 108 may access the list of e-mail address from the storage 109.

A set of electronic devices 111, 112, 113 may communicate with the e-mail server(s) via the network(s) 115. It should be understood that the set of electronic devices 111, 112, 113 may include any electronic device capable of retrieving electronic communications such as, for example, desktop computers, notebook computers, mobile phones, smartphones, tablet devices, PDAs, and/or the like. In operation, a set of users of the set of electronic devices 111, 112, 113 may access, via the appropriate e-mail server 116, respective e-mail accounts where the e-mail from the e-mail module 108 may be included in the user's "inbox."

A respective e-mail client or application of the set of electronic devices 111, 112, 113 may access the e-mail including the markup language file and may identify the appropriate layout based on the corresponding display characteristic of the electronic device 111, 112, 113 or applications thereof. In particular, the e-mail client may support cascading style sheets (CSS) which enable the e-mail client to identify the appropriate layout to display based on the display characteristic of the accessing electronic device 111, 112, 113 or applications thereof. The e-mail client may also display, on a user interface of the electronic device 111, 112, 113, the e-mail according to the appropriate layout. In this regard, the e-mail content is displayed on the accessing electronic device 11, 112, 113 as the original designer intended.

Figure 2:
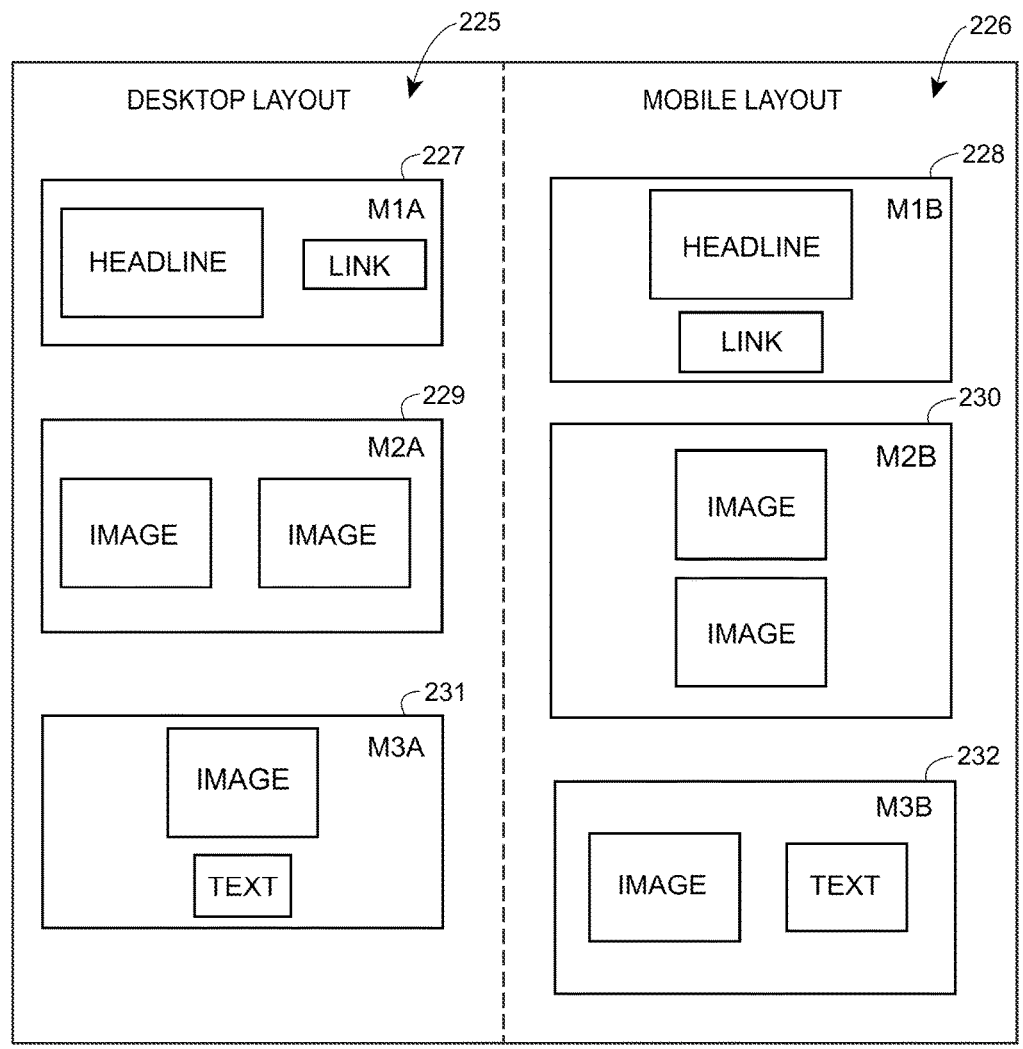
FIG. 2 depicts example layouts of an adaptive e-mail, in accordance with some embodiments.

FIG. 2 illustrates an example representation of multiple layouts of a single e-mail. In particular, FIG. 2 illustrates a desktop layout 225 for an e-mail and a mobile layout 226 for the e-mail. Each of the desktop layout 225 and the mobile layout 226 includes a sequence of modules containing various combinations of visual content and textual content (including selectable CTAs or links).

The respective modules for the desktop layout 225 and the mobile layout 226 may include the same content (and therefore the same ordering of modules), but are designed to be displayed on different user interfaces (e.g., desktop display or mobile display). In particular, a module 227 "M1A" on the desktop layout 225 includes a large headline on the left and a smaller link on the right, whereas a corresponding module 228 "M1B" of the mobile layout 226 includes a large headline on the top and a large link on the bottom. While the smaller link of the module 227 may be sized appropriately for a larger desktop display, the smaller link of the module 227 may be too small for a smaller mobile display. Accordingly, the link of the module 228 is sized larger for ease of viewing on a mobile display. Additional design differences between the modules 227, 228 are envisioned.

Similarly, a module 229 "M2A" on the desktop layout 225 includes two images aligned side-by-side and a corresponding module 230 "M2B" on the mobile layout 226 includes the same two images aligned in a top-to-bottom arrangement, as the size of the mobile display may be too small to display the images side-by-side. Further, a module 231 "M3A" on the desktop layout 225 includes an image on top of text and a corresponding module 232 "M3B" on the mobile layout 226 includes the image side-by-side with the text, thus improving the readability of the text on the smaller mobile display.

In operation, a designer (such as an operator of the designer module 106) may specify the ordering of the modules and a programmer (such as an operator of the presentation module 107) may access the ordering. It should be appreciated that the designer and the programmer may be the same individual. Further, it should be appreciated that the module ordering and access may be facilitated automatically by the respective modules. Using the example of FIG. 2, the module ordering for each the desktop layout 225 and the mobile layout 226 may include M1, followed by M2, followed by M3. There are display-specific modules for each of the desktop layout 225 (namely, M1A, M2A, and M3A) and the mobile layout 226 (namely, M1B, M2B, and M3B). The programmer may arrange the desktop layout 225 and mobile layout 226 with the display-specific modules as specified by the module ordering. As discussed herein, each of the display-specific modules includes markup language specifying how the content is to be displayed on a display screen. As an example, the HTML markup language for an example desktop module M1 may include the following code:

```
<!DOCTYPE Desktop Module M1>
<html>
<body>
<h2>[Insert Heading]</h2>
<img border="0" src="[Insert Image]" width="912" height="684">
</body>
</html>
```

The HTML markup language for an example mobile module M1 may include the following:

```
<!DOCTYPE Mobile Module M1>
<html>
<body>
<h1>[Insert Heading]</h1>
<img border="0" src="[Insert Image]" width="304" height="228">
</body>
</html>
```

The design parameters of the desktop module M1 are different than those of the mobile module M1. In particular, the mobile module M1 includes a heading that is larger (h1 vs. h2) than the heading of the desktop module M1. Further, the dimensions of the image in the desktop module M1 are three times larger than the dimensions of the image in the mobile module M1. The programmer may edit the markup language in each of the modules to include specific visual and/or textual content. In particular, the programmer may insert image paths for images to be displayed and/or textual content to be included. Continuing with the above example, the programmer can edit the HTML markup language for the desktop module M1 as follows:

```
<!DOCTYPE Desktop Module M1>
<html>
<body>
<h2>Weekly Specials</h2>
<img border="0" src="/images/SpecialsWeek1.jpg" width="912" height="684">
</body>
</html>
```

Further, the programmer can edit the HTML markup language for the mobile module M1 as follows:

```
<!DOCTYPE Mobile Module M1>
<html>
<body>
<h1>Weekly Specials</h1>
<img border="0" src="/images/SpecialsWeek1.jpg" width="304" height="228">
</body>
</html>
```

In this regard, the edited desktop module M1 and mobile module M1 include the same content (namely, the headline "Weekly Specials" and the image "SpecialsWeek1.jpg"), albeit with different display parameters. In particular, the headline appears larger (relative to other content) on the mobile device than the corresponding headline appears on the desktop device. Further, the dimensions of the image in the desktop module M1 are larger than the dimensions of the image in the mobile module M1. Accordingly, the edited desktop module M1 and mobile module M1 are specifically designed for display on respective desktop and mobile devices.

The markup language file not only includes the edited modules, but also includes a section (or "media query") that specifies which modules to render based on a display characteristic (e.g., screen size, resolution, etc.) of the accessing electronic device. The media query section may be supported by the CSS style sheet language, where the CSS code is included within an HTML markup language file (i.e., the code is a combination of CSS and HTML). An example media query specifying different layouts depending on the resolution of the accessing device in an HTML markup language file is reproduced below:

```
<link rel="stylesheet" type="text/css" media="screen and (max-width: 700 px)" href="css/devices/screen/layout-modify1.css">
<link rel="stylesheet" type="text/css" media="screen and (min-width: 701 px) and (max-width: 900 px)" href="css/devices/screen/layout-modify2.css">
<link rel="stylesheet" type="text/css" media="screen and (min-width: 901 px)" href="css/devices/screen/layout-modify3.css">
```

Therefore, when an electronic device having a resolution of 700 pixels or under accesses the media query, the electronic device will access the "layout-modify1" section of the HTML markup language file, which includes modules that are designed for smaller-resolution devices (e.g., a smartphone). Similarly, when an electronic device having a resolution between 700 and 900 pixels accesses the media query, the electronic device will access the "layout-modify2" section of the markup language file, which presumably includes modules that are designed for medium-resolution devices (e.g., a tablet). Further, when an electronic device having a resolution of 901 pixels and larger accesses the media query, the electronic device will access the "layout-modify3" section of the markup language file, which presumably includes modules that are designed for larger-resolution devices (e.g., a notebook computer). It should be appreciated that the media queries support other various types of display characteristics of the accessing device and/or any applications executing thereon. For example, the media query may be specified by the width and/or height of a browser window, a width and/or height of the accessing device itself, or an orientation (e.g., portrait or landscape) of the accessing device.

Figure 3:
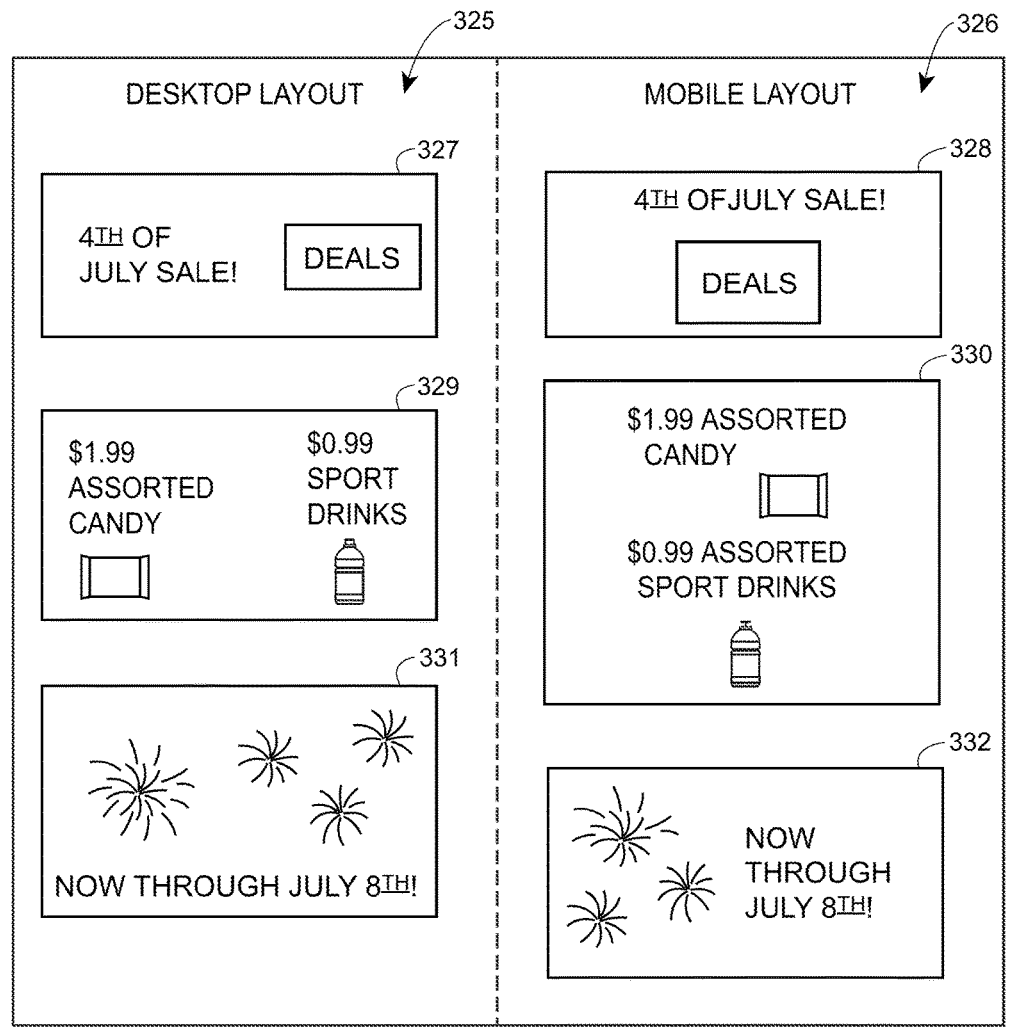
FIG. 3 depicts example layouts of an adaptive e-mail populated with content, in accordance with some embodiments.

FIG. 3 illustrates an example representation of multiple layouts of a single e-mail with content added to the modules thereof. In particular, FIG. 3 illustrates a desktop layout 325 for an e-mail and a mobile layout 326 for the e-mail. Each of the desktop layout 325 and the mobile layout 326 includes a sequence of modules containing various combinations of display content such as images and textual content (including selectable CTAs or links).

As illustrated in FIG. 3, the desktop layout 325 includes modules 327, 329, 331 that are consistent with the modules 227, 229, 231 of the desktop layout 225 of FIG. 2. Additionally, the mobile layout 326 includes modules 328, 330, 332 that are consistent with the modules 228, 230, 232 of the mobile layout 226 of FIG. 2. However, the layouts 325, 326 of FIG. 3 include display content that is added via modifications to program code of the corresponding modules. For example, respective tags or labels in each of the modules 327 and 328 have been modified to include the text "4th OF JULY SALE!" and as well as the "DEALS" link.

Although the desktop layout 325 and the mobile layout 326 include the same content, the desktop layout 325 and the module layout 326 appear different from each other because the modules 325, 326 have been designed for viewing on displays having different characteristics (e.g., resolution, screen size, etc.). For example, the module 327 of the desktop layout 325 has the "DEALS" link side-by-side with the "4th OF JULY SALE!" text, where the text size of the "DEALS" link is smaller relative to the size of the module 327. In contrast, the module 328 of the mobile layout 326 has the "DEALS" link below the "4th OF JULY SALE!" text, where the text size of the "DEALS" link is larger relative to the size of the module 328. Accordingly, the module 328 is designed to be viewed on a smaller-size device (e.g., a smartphone) and the module 327 is designed to be viewed on a larger-size device (e.g., a notebook computer). The remaining modules 329, 330, 331, 332 have similar design considerations.

Figure 4:
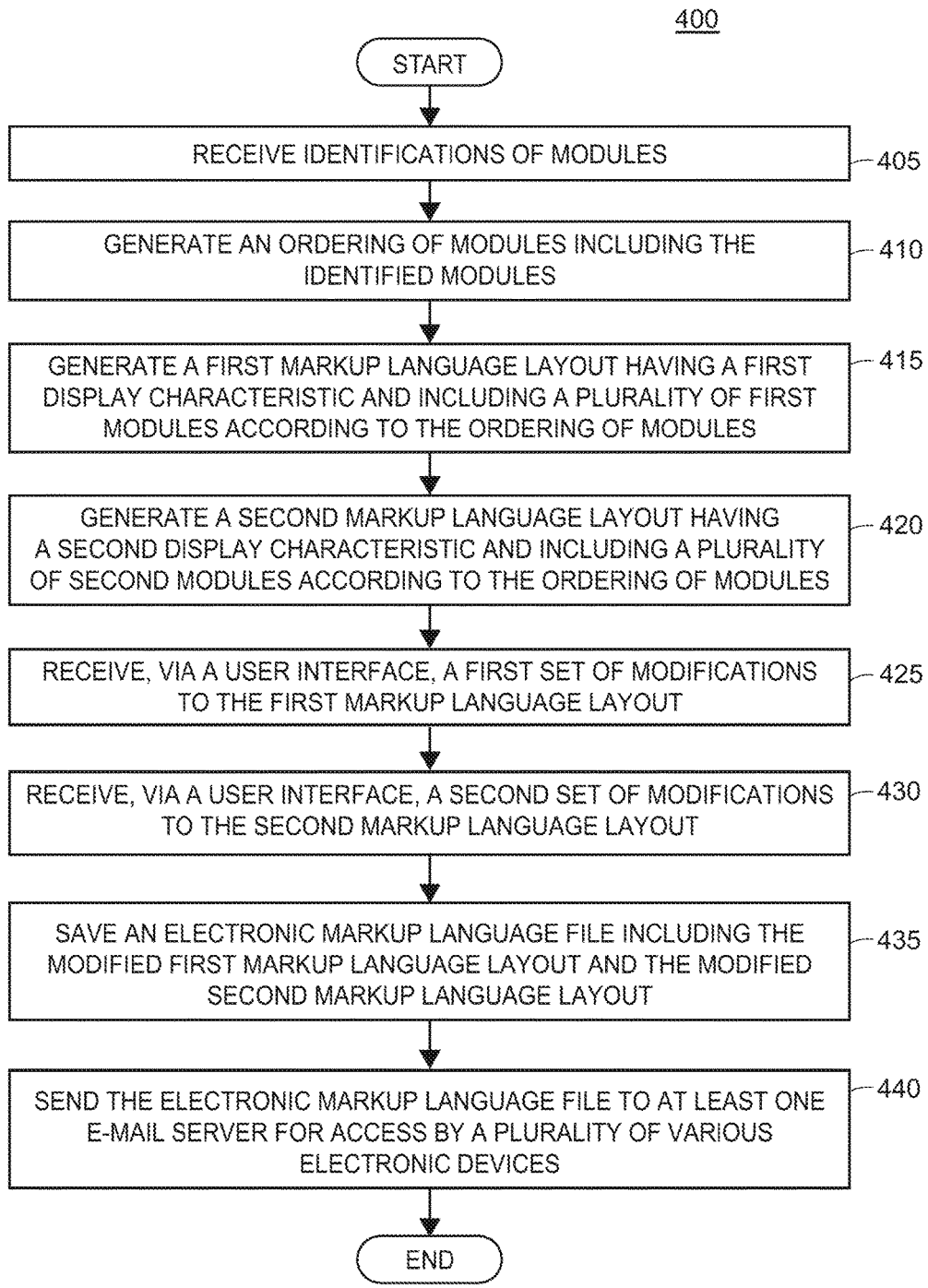
FIG. 4 depicts a flow diagram associated with processing and generating adaptive e-mail, in accordance with some embodiments.

Referring to FIG. 4, depicted is a block diagram of an example method 400 for generating adaptive markup files compatible with a plurality of display characteristics. The method 400 may be facilitated by a server, such as the processing server 105 as discussed with respect to FIG. 1. The server may support one or more modules to facilitate the various functions as well as various interfaces to enable user input and selections.

The method 400 can begin with the server receiving (block 405) identifications of modules. In particular, the server may enable a user such as a designer or developer to specify the modules based on design preferences or other factors. The server can generate (block 410) an ordering of modules that includes the identified modules. In particular, the server may also enable the user to specify the ordering of modules when identifying the modules. It should be appreciated that the server may automatically identify the modules and order the modules based on various factors or requirements.

In embodiments, each of the identified modules may have multiple display-specific modules that correspond to various devices having various display characteristics. For example, a "title" module can include a mobile version, a tablet version, and a desktop version. Therefore, the server can generate (block 415) a first markup language layout having a first display characteristic and including a plurality of first modules according to the ordering of modules. In embodiments, the first display characteristic may correspond to a screen resolution, a screen size, an application width/height, an orientation, or the like. Further, the plurality of first modules may be particular to the first display characteristic. For example, if the first display characteristic corresponds to a smartphone, then the plurality of first modules may be specific to a smartphone display. The server can also generate (420) a second markup language layout having a second display characteristic and including a plurality of second modules according to the ordering of modules. In embodiments, the second display characteristic may also correspond to a screen resolution, a screen size, an application width/height, or the like, and may be different from the first display characteristic. Further, the plurality of second modules may be particular to the second display characteristic. For example, if the second display characteristic corresponds to a tablet device, then the plurality of second modules may be specific to a tablet display.

The server can receive (block 425), via a user interface, a first set of modifications to the first markup language layout and can receive (430), via the user interface, a second set of modifications to the second markup language layout. In particular, the server may enable a user to add textual and/or visual content to the first and second markup language layouts. For example, if the markup language is HTML, then the server can enable the user to add text and link to images through the tags in the HTML files. The textual and visual content may or may not be consistent between the first and second markup language layouts.

The server can save (block 435) an electronic markup language file including the modified first markup language layout and the modified second markup language layout. In embodiments, each of the modified first markup language layout and the modified language layout may reference (e.g., via a CSS media type) a media characteristic that indicates, to an accessing device, which of the layouts to display. The server may configure the electronic markup language file such that one of the modified first markup language layout or the modified second language layout will always be selected by an accessing device (i.e., in no situation would an accessing device not select one of the modified first markup language layout or the modified second language layout). In some cases, the electronic markup language file may indicate a default layout for an accessing device to access if the accessing device does not support a specified media characteristic.

After generating the electronic markup language file, the server can send (block 440) the electronic markup language file to at least one e-mail server for access by a plurality of various electronic devices. In particular, users may use the plurality of various electronic devices to access e-mail accounts to access and view the electronic markup language file, where the specific markup language layout that a particular electronic device displays is based on the corresponding display characteristic of the particular electronic device. For example, a notebook computer having a certain resolution may display a desktop layout of an e-mail and a smartphone having another resolution may display a mobile layout of the e-mail.

Figure 5:
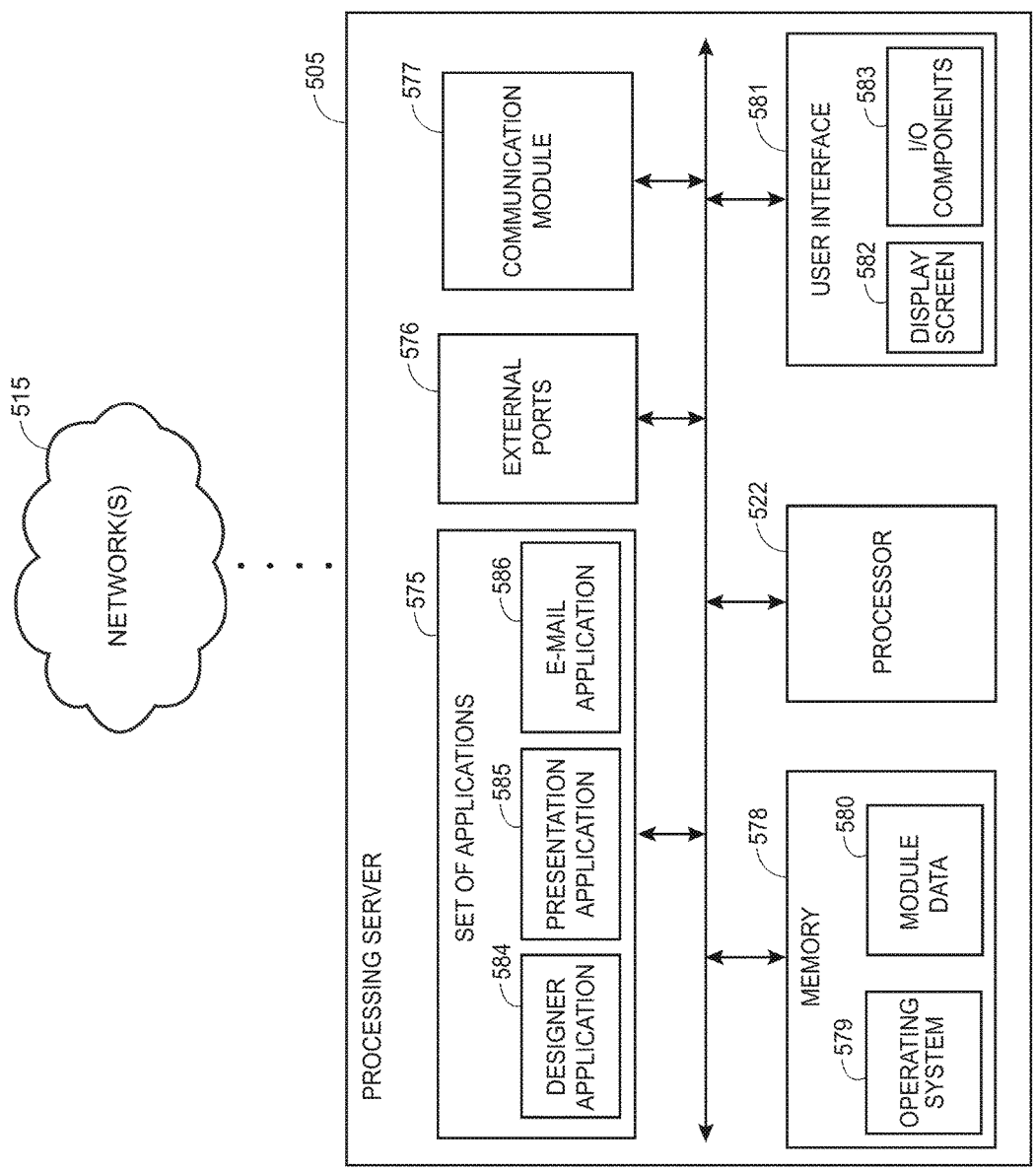
FIG. 5 is a block diagram of a processing server in accordance with some embodiments.

FIG. 5 illustrates a diagram of an example processing server 505 (such as the processing server 105 discussed with respect to FIG. 1) in which the functionalities as discussed herein may be implemented.

The processing server 505 can include a processor 522 as well as a memory 578. The memory 578 can store an operating system 579 capable of facilitating the functionalities as discussed herein as well as a set of applications 575 (i.e., machine readable instructions). For example, one of the set of applications 575 can be a designer application 584 configured to facilitate the design of e-mail layouts and modules thereof, another of the set of applications 575 can be a presentation application 585 configured to facilitate the editing of e-mail layouts and modules there, and another of the set of applications 575 can be an e-mail application 586 configured to transmit e-mails to entities such as e-mail providers. It should be appreciated that other applications are envisioned.

The processor 522 can interface with the memory 578 to execute the operating system 579 and the set of applications 575. According to embodiments, the memory 578 can also store module data 580 including computer-executable code and instructions to be used in designing and generating e-mails. Each of the set of applications 575 may interface with the module data 580 to facilitate the generation of e-mails. The memory 578 may further store e-mail identification data, such as e-mail distribution lists. The memory 578 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 505 can further include a communication module 577 configured to communicate data via one or more networks 515. According to some embodiments, the communication module 577 can include one or more transceivers (e.g., WWAN, WLAN, and/or WPAN transceivers) functioning in accordance with IEEE standards, 3GPP standards, or other standards, and configured to receive and transmit data via one or more external ports 578. For example, the communication module 577 can send, via the network 515, generated e-mails to e-mail providers. The processing server 505 may further include a user interface 581 configured to present information to a user and/or receive inputs from the user. As shown in FIG. 5, the user interface 581 includes a display screen 582 and I/O components 583 (e.g., ports, capacitive or resistive touch sensitive input panels, keys, buttons, lights, LEDs, speakers, microphones). According to embodiments, the user may access the processing server 505 via the user interface 581 to design e-mail layouts and facilitate other functionalities. In some embodiments, the processing server 505 can perform the functionalities as discussed herein as part of a "cloud" network or can otherwise communicate with other hardware or software components within the cloud to send, retrieve, or otherwise analyze data.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed:

1. A computer-implemented method of generating adaptive markup files compatible with a plurality of display characteristics, the method comprising:
receiving, via a user interface, an identification of a first ordered module to be included in an ordering of modules, the first ordered module including computer-executable code and having associated (i) a first sub-module including a first set of display elements designed for display on a first type of accessing electronic device having a first screen resolution width, and (ii) a second sub-module including the first set of display elements designed for display on a second type of accessing electronic device having a second screen resolution width greater than the first screen resolution width, wherein the first set of display elements indicates an image, wherein the first sub-module specifies, for the image to be displayed on the first type of accessing electronic device, a first width display dimension equal to or less than the first screen resolution width and a first height display dimension, and wherein the second sub-module specifies, for the image to be displayed on the second type of accessing electronic device, a second width display dimension (i) greater than the first screen resolution width, and (ii) equal to or less than the second screen resolution width, and a second height display dimension different from the first height display dimension;
receiving, via the user interface, an identification of a second ordered module to be included following the first ordered module in the ordering of modules, the second ordered module including computer-executable code and having associated (i) a third sub-module including a second set of display elements designed for display on the first type of accessing electronic device and (ii) a fourth sub-module including the second set of display elements designed for display on the second type of accessing electronic device, each of the first, second, third, and fourth modules corresponding to a snippet of markup language associated with visual content;
automatically accessing, from a memory, the first, second, third, and fourth sub-modules;
automatically generating, by one or more processors, a first markup language layout including the first sub-module and the third sub-module, the first markup language layout generated to specify at least a first screen width parameter greater than or equal to the first screen resolution width;
automatically generating, by one or more processors, a second markup language layout including the second sub-module and the fourth sub-module, the second markup language layout generated to specify at least a second screen width parameter greater than or equal to the second screen resolution width;
receiving, via the user interface, a set of modifications to the first markup language layout and to the second markup language layout, the set of modifications identifying the image; and saving, by one or more processors, an electronic markup language file for inclusion in an electronic communication for display by the first type of accessing electronic device and the second type of accessing device, the electronic markup language file including the first markup language layout with the set of modifications, the second markup language layout with the set of modifications, and a media query informing that (i) due to the first screen width parameter, the first markup language layout is accessed by the first type of accessing electronic device, and (ii) due to the second screen width parameter, the second markup language layout is accessed by the second type of accessing electronic device.

2. The method of claim 1, wherein each of the first markup language layout and the second markup language layout further specifies at least one of: a resolution of an accessing electronic device, a dimension of one of the accessing electronic device or an application supported by the accessing electronic device, or an orientation of the accessing electronic device.

3. The method of claim 1, wherein receiving the set of modifications comprises:
receiving textual content within each of the first markup language layout and the second markup language layout, wherein the textual content is configured to be displayed upon access of the electronic markup language file by the first type of accessing electronic device and the second type of accessing electronic device.

4. The method of claim 1, wherein receiving the set of modifications comprises:
receiving a first set of textual content within the first markup language layout; and
receiving a second set of textual content within the second markup language layout;
wherein the first set of textual content is configured to be displayed upon access of the electronic markup language file by the first type of accessing electronic device, and the second set of textual content is configured to be displayed upon access of the electronic markup language file by the second type of accessing electronic device.

5. The method of claim 1, further comprising:
sending the electronic markup language file to at least one e-mail server for access by at least one of the first type of accessing electronic device and the second type of accessing electronic device.

6. The method of claim 1, where saving the electronic markup language file includes saving the electronic markup language file in the HyperText Markup Language (HTML) format.

7. A system for generating adaptive markup files compatible with a plurality of display characteristics, comprising:
a user interface configured to receive content;
a memory for storing (i) a plurality of sub-modules, each of the plurality of sub-modules including computer-readable markup language code associated with visual content, and (ii) a set of instructions; and
a processor configured to interface with the user interface and the memory, and configured to execute the set of instructions to cause the processor to:
receive, via the user interface, an identification of a first ordered module to be included in an ordering of modules, the first ordered module including computer-executable code and having associated (i) a first sub-module of the plurality of sub-modules including a first set of display elements designed for display on a first type of accessing electronic device having a first screen resolution width, and (ii) a second sub-module of the plurality of sub-modules including the first set of display elements designed for display on a second type of accessing electronic device having a second screen resolution width greater than the first screen resolution width, wherein the first set of display elements indicates an image, wherein the first sub-module specifies, for the image to be displayed on the first type of accessing electronic device, a first width display dimension equal to or less than the first screen resolution width and a first height display dimension, and wherein the second sub-module specifies, for the image to be displayed on the second type of accessing electronic device, a second width display dimension (i) greater than the first screen resolution width, and (ii) equal to or less than the second screen resolution width, and a second height display dimension different from the first height display dimension,
receive, via the user interface, an identification of a second ordered module to be included following the first ordered module in the ordering of modules, the second ordered module including computer-executable code and having associated (i) a third sub-module of the plurality of sub-modules including a second set of display elements designed for display on the first type of accessing electronic device and (ii) a fourth sub-module of the plurality of sub-modules including the second set of display elements designed for display on the second type of accessing electronic device,
automatically access, from the memory, the first, second, third, and fourth sub-modules,
automatically generate a first markup language layout including the first sub-module and the third sub-module, the first makeup language layout generated to specify at least a first screen width parameter greater than or equal to the first screen resolution width,
automatically generate a second markup language layout including the second sub-module and the fourth sub-module, the second markup language layout generated to specify at least a second screen width parameter greater than or equal to the second screen resolution width,
receive, via the user interface, a set of modifications to the first markup language layout and to the second markup language layout, the set of modifications identifying the image, and
save an electronic markup language file for inclusion in an electronic communication for display by the first type of accessing electronic device and the second type of accessing device, the electronic markup language file including the first markup language layout with the set of modifications, the second markup language layout with the set of modifications, and a media query informing that (i) due to the first screen width parameter, the first markup language layout is accessed by the first type of accessing electronic device, and (ii) due to the second screen width parameter, the second markup language layout is accessed by the second type of accessing electronic device.

8. The system of claim 7, wherein each of the first markup language layout and the second markup language layout further specifies at least one of: a resolution of an accessing electronic device, a dimension of one of the accessing electronic device or an application supported by the accessing electronic device, or an orientation of the accessing electronic device.

9. The system of claim 7, wherein to receive the set of modifications, the processor is configured to:
   receive textual content within each of the first markup language layout and the second markup language layout, wherein the textual content is configured to be displayed upon access of the electronic markup language file by the first type of accessing electronic device and the second type of accessing electronic device.

10. The system of claim 7, wherein to receive the set of modifications, the processor is configured to:
   receive a first set of textual content within the first markup language layout, and
   receive a second set of textual content within the second markup language layout,
   wherein the first set of textual content is configured to be displayed upon access of the electronic markup language file by the first type of accessing electronic device, and the second set of textual content is configured to be displayed upon access of the electronic markup language file by the second type of accessing electronic device.

11. The system of claim 7, further comprising:
   a transceiver;
   wherein the processor is further configured to send, via the transceiver, the electronic markup language file to at least one e-mail server for access by at least one of the first type of accessing electronic device and the second type of accessing electronic device.

12. The system of claim 7, wherein the processor saves the electronic markup language file in the HyperText Markup Language (HTML) format.

* * * * *